(12) United States Patent
Nagao et al.

(10) Patent No.: US 10,900,491 B2
(45) Date of Patent: Jan. 26, 2021

(54) COMPRESSOR SYSTEM INCLUDING GAS BEARING, AND METHOD OF SUPPLYING GAS TO COMPRESSOR INCLUDING GAS BEARING

(71) Applicant: MITSUBISHI HEAVY INDUSTRIES COMPRESSOR CORPORATION, Tokyo (JP)

(72) Inventors: Hideki Nagao, Hiroshima (JP); Tomoaki Okamura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 15/578,489

(22) PCT Filed: Dec. 9, 2016

(86) PCT No.: PCT/JP2016/005098
§ 371 (c)(1),
(2) Date: Nov. 30, 2017

(87) PCT Pub. No.: WO2018/104987
PCT Pub. Date: Jun. 14, 2018

(65) Prior Publication Data
US 2018/0306193 A1  Oct. 25, 2018

(51) Int. Cl.
*F04D 17/12* (2006.01)
*F04D 29/048* (2006.01)
(Continued)

(52) U.S. Cl.
CPC ......... *F04D 17/12* (2013.01); *F04D 25/0686* (2013.01); *F04D 29/048* (2013.01);
(Continued)

(58) Field of Classification Search
CPC ...... F04D 17/12; F04D 29/048; F04D 29/057; F04D 25/064; F04D 25/066; F16C 17/28
(Continued)

(56) References Cited

U.S. PATENT DOCUMENTS 2,603,539 A  *  7/1952  Brewster ................. F16C 32/06
                                                384/107
6,539,642 B1 *  4/2003  Moriyasu ............. G01B 11/007
                                                33/551
(Continued)

FOREIGN PATENT DOCUMENTS

CN      106015032 A    10/2016
EP       0212091 A1     3/1987
(Continued)

OTHER PUBLICATIONS

English Translation of JP S62-20604 obtained Sep. 10, 2018 (Year: 2018).*

(Continued)

*Primary Examiner* — Connor J Tremarche
(74) *Attorney, Agent, or Firm* — Osha Liang LLP

(57) ABSTRACT

A compressor system includes; a compression section that sucks and compresses gas; a rotor that includes the compression section; a gas bearing that supports the rotor; a dynamic-pressure generating gas supply system that supplies, to a gas supply port for dynamic pressure of the gas bearing, bleed gas from the gas pressurized by the compression section; and an external gas supply system for static pressure that supplies, to a gas supply port for static pressure of the gas bearing, external gas from outside of the compression section. The dynamic-pressure generating gas supply system and the external gas supply system for static pressure respectively include paths that are independent of each other to the gas bearing. The gas supply port for
(Continued)

dynamic pressure and the gas supply port for static pressure are independent of each other.

19 Claims, 12 Drawing Sheets

(51) Int. Cl.
| | |
|---|---|
| *F04D 29/057* | (2006.01) |
| *F04D 29/58* | (2006.01) |
| *F04D 25/06* | (2006.01) |
| *F16C 32/06* | (2006.01) |

(52) U.S. Cl.
CPC ......... *F04D 29/057* (2013.01); *F04D 29/584* (2013.01); *F04D 29/5813* (2013.01); *F16C 32/0614* (2013.01); *F16C 32/0622* (2013.01); *F04D 25/064* (2013.01); *F04D 25/0666* (2013.01)

(58) Field of Classification Search
USPC ........................................................ 417/365
See application file for complete search history.

(56) References Cited

U.S. PATENT DOCUMENTS

| | | | | |
|---|---|---|---|---|
| 2014/0254966 | A1* | 9/2014 | Zhou | F16C 17/028 384/291 |
| 2015/0104123 | A1* | 4/2015 | Ertas | F16C 32/0618 384/119 |
| 2015/0323000 | A1* | 11/2015 | Shoup | F16C 33/02 384/116 |
| 2017/0370364 | A1 | 12/2017 | Gu et al. | |

FOREIGN PATENT DOCUMENTS

| | | | | |
|---|---|---|---|---|
| JP | S57-036436 | B2 | | 8/1982 |
| JP | S58-196319 | A | | 11/1983 |
| JP | S62-20604 | A | | 1/1987 |
| JP | S6220604 | A | * | 1/1987 |
| JP | S6220604 | B2 | * | 5/1987 ............... G11B 5/02 |
| JP | S63-199994 | A | | 8/1988 |
| JP | H08-232885 | A | | 9/1996 |
| JP | 11013686 | A | * | 1/1999 |
| JP | 2004-197606 | A | | 7/2004 |
| JP | 2009-168241 | A | | 7/2009 |
| JP | 2009168241 | A | * | 7/2009 |
| JP | 2014-126038 | A | | 7/2014 |
| JP | 2014126038 | A | * | 7/2014 |

OTHER PUBLICATIONS

English Translation of JP-11013686-A obtained Feb. 26, 2019 (Year: 2019).*
Written Opinion of the International Searching Authority issued in corresponding application No. PCT/JP2016/005098 dated Feb. 14, 2017 (4 pages).
Office Action issued in Japanese application No. 2017-532181 dated Jul. 11, 2017 (5 pages).
Notice of Allowance issued in corresponding Japanese Patent Application No. 2017-532181 dated Aug. 22, 2017, with translation (4 pages).
Notification of Reasons for Refusal issued in corresponding Japanese Patent Application No. 2017-532181 dated Jul. 11, 2017, with translation (11 pages).
Extended European Search Report in corresponding European Application No. 16923211.3, dated Jul. 25, 2019 (9 pages).

* cited by examiner

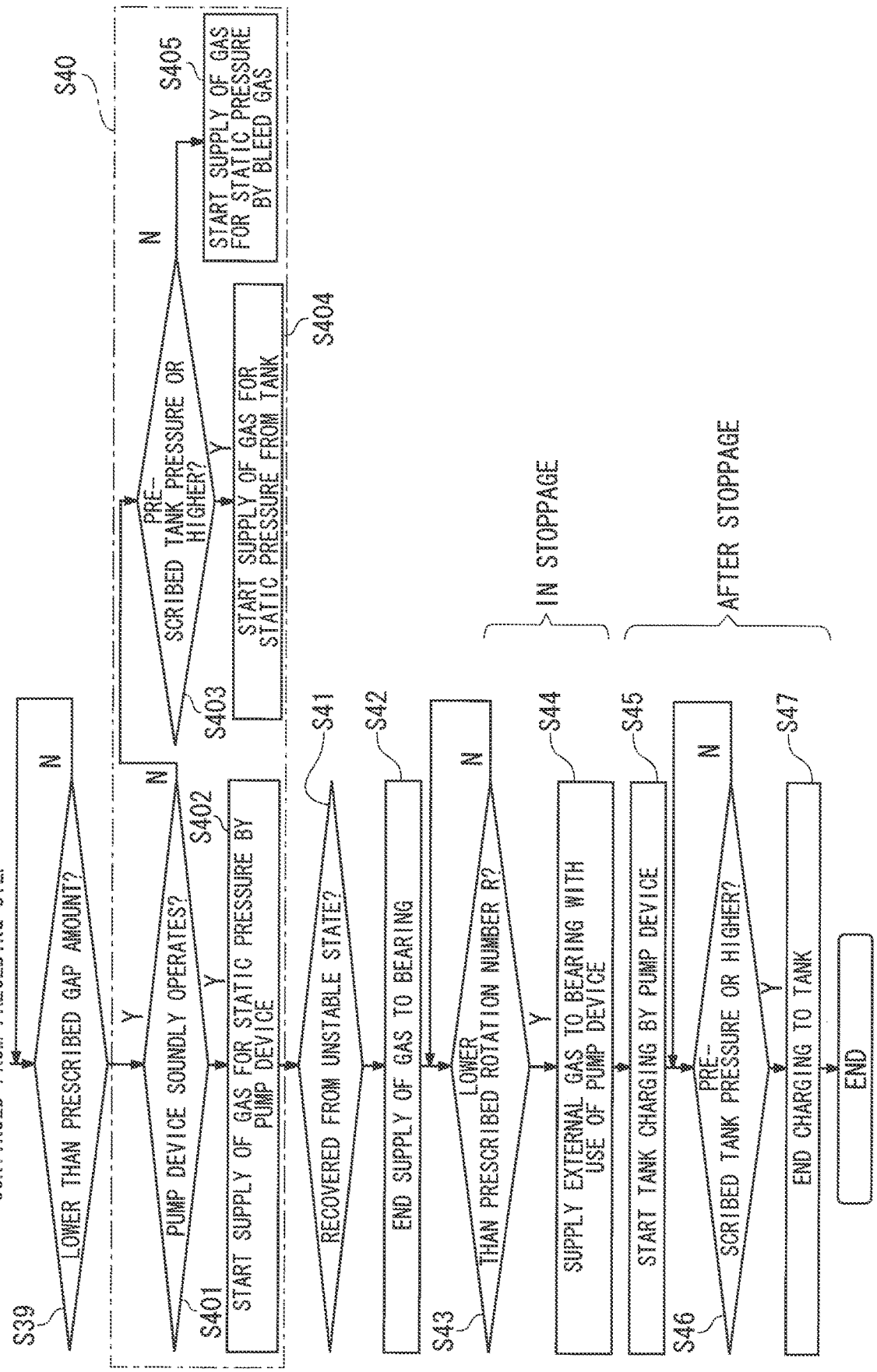

COMPRESSOR SYSTEM INCLUDING GAS BEARING, AND METHOD OF SUPPLYING GAS TO COMPRESSOR INCLUDING GAS BEARING

TECHNICAL FIELD

The present invention relates to a compressor system including a gas bearing, and to a method of supplying gas to a compressor including a gas bearing.

BACKGROUND ART

Dynamic pressure of gas is caused on bearing surfaces of a journal bearing and a thrust bearing that support a rotor of a compressor, which makes it possible to support the rotor in a non-contact manner (PLT 1).

In PLT 1, a gas supply pipe that communicates from a discharge chamber of a centrifugal compressor to the bearing is used. A portion of the gas pressurized by the centrifugal compressor is supplied to the bearing through the gas supply pipe. Therefore, the supplied gas is caught between the rotating rotor and a pad of the bearing to form an air film, thereby generating the dynamic pressure.

CITATION LIST

Patent Literature

[PTL 1] Japanese Patent Publication No. 8-232885

It is difficult for the gas bearing that generates the dynamic pressure to support the rotor described above to obtain the dynamic pressure sufficient to support the rotor when a rotation number of the compressor is low.

Therefore, it is considered to adopt, instead of the dynamic pressure method, a static pressure method in which gas is forcibly fed to a bearing with use of a pump or the like and the rotor is supported by pressure (static pressure) of the gas supplied between a pad of the bearing and the rotor, irrespective of rotation of the rotor. The pump device that provides large pressure sufficient to support the rotor, however, has a short product lifetime. A pump device that is matched with necessary pressure and is usable for a long term is extremely expensive if any.

SUMMARY OF INVENTION

One or more embodiments of the present invention provides a compressor system and a method of supplying gas that are usable for a long term and makes it possible to improve reliability while suppressing a cost of a device, for gas supply to a gas bearing of a compressor.

A compressor system according to one or more embodiments of the present invention includes: a compression section that sucks and compresses gas; a rotor including the compression section; a gas bearing supporting the rotor; a dynamic-pressure generating gas supply system that supplies, to the gas bearing, bleed gas from the gas pressurized by the compression section; and an external gas supply system for static pressure that supplies, to the gas bearing, external gas from outside of the compression section.

The term "external gas from outside of compression section" indicates external gas that is supplied from outside of a case that houses the compression section.

In the compressor system according to one or more embodiments of the present invention, the external gas supply system for static pressure may include an external gas supply source that forcibly feeds the external gas.

The compressor system according to one or more embodiments of the present invention may include a tank into which the external gas is chargeable by the external gas supply source.

The compressor system according to one or more embodiments of the present invention may include a bleed gas charging system that charges the bleed gas into the tank.

The compressor system according to one or more embodiments of the present invention may include a gas supply system for bleed gas static pressure that supplies the bleed gas to the gas bearing.

The compressor system according to one or more embodiments of the present invention may include a pad cooling system that supplies the bleed gas to a pad of the gas bearing.

The compressor system according to one or more embodiments of the present invention may include a motor that provides rotational driving force to the rotor, and a motor cooling system that communicates with a vicinity of the motor inside a casing housing the motor, and supplies the bleed gas to the motor.

The compressor system according to one or more embodiments of the present invention may include a gas cooler that performs heat exchange between the bleed gas and a medium that is lower in temperature than the bleed gas.

The compressor system according to one or more embodiments of the present invention may include a control section that intermittently uses the external gas supply system for static pressure.

In addition, a method of supplying gas to a compressor including a gas bearing that supports a rotor according to one or more embodiments of the present invention, includes: supplying, to the gas bearing, bleed gas from the gas pressurized by the compressor while the rotor rotates; and supplying any of external gas from outside of the compressor and the bleed gas to the gas bearing to generate static pressure when a rotation speed of the rotor is lower than a prescribed dynamic-pressure satisfaction rotation speed, or when a gap amount between the rotor and a pad of the gas bearing is lower than a prescribed value.

In the method of supplying gas according to one or more embodiments of the present invention, the dynamic-pressure satisfaction rotation speed is possibly a rotation speed in startup or stoppage of the compressor.

In the method of supplying gas according to one or more embodiments of the present invention, when the rotation speed of the rotor is higher than the dynamic-pressure satisfaction rotation speed, also in a case where a gap amount between the rotor and the pad of the gas bearing is lower than the prescribed value or a vibration value of a shaft of the rotor is larger than a prescribed value, any of the external gas and the bleed gas is supplied to the gas bearing to generate static pressure.

In the method of supplying gas according to one or more embodiments of the present invention, any of the external gas, the bleed gas, and gas in a tank is supplied to the gas bearing to generate static pressure. The external gas is forcibly fed by an external gas supply source outside the compressor, and the tank is in advance charged with the external gas or the bleed gas.

In the method of supplying gas according to one or more embodiments of the present invention, the gas in the tank is supplied to the gas bearing in a case where abnormality occurs on the external gas supply source.

In the method of supplying gas according to one or more embodiments of the present invention, the pad of the gas bearing is cooled with use of the bleed gas.

In the method of supplying gas according to one or more embodiments of the present invention, a motor that provides rotational driving force to the rotor is cooled with use of the bleed gas.

According to the compressor system or the method of supplying gas to the gas bearing of the compressor of one or more embodiments of the present invention, it is possible to supply the bleed gas and the external gas to the gas bearing. This makes it possible to assist the dynamic pressure by the static pressure by supplying the bleed gas to the gas bearing when the rotation number is sufficiently high to provide the dynamic pressure necessary for supporting the rotor, and by supplying the external gas to the gas bearing when the rotation number is relatively low.

As a result, it is possible to secure the pressure sufficient to support the rotor in the gas bearing even when the rotation number is relatively low. This makes it possible to improve reliability.

In addition, since it is sufficient to intermittently operate the external gas supply source, adopting an inexpensive pump device and the like even having a short product lifetime makes it possible to provide a system usable for a long term while suppressing the cost.

BRIEF DESCRIPTION OF THE DRAWINGS

FIG. 12 is a diagram illustrating an example of the procedure of the method of supplying gas according to one or more embodiments of the invention (following the procedure of FIG. 11).

DETAILED DESCRIPTION OF EMBODIMENTS

Some embodiments of the present invention are described below with reference to accompanying drawings.

Figure 1:
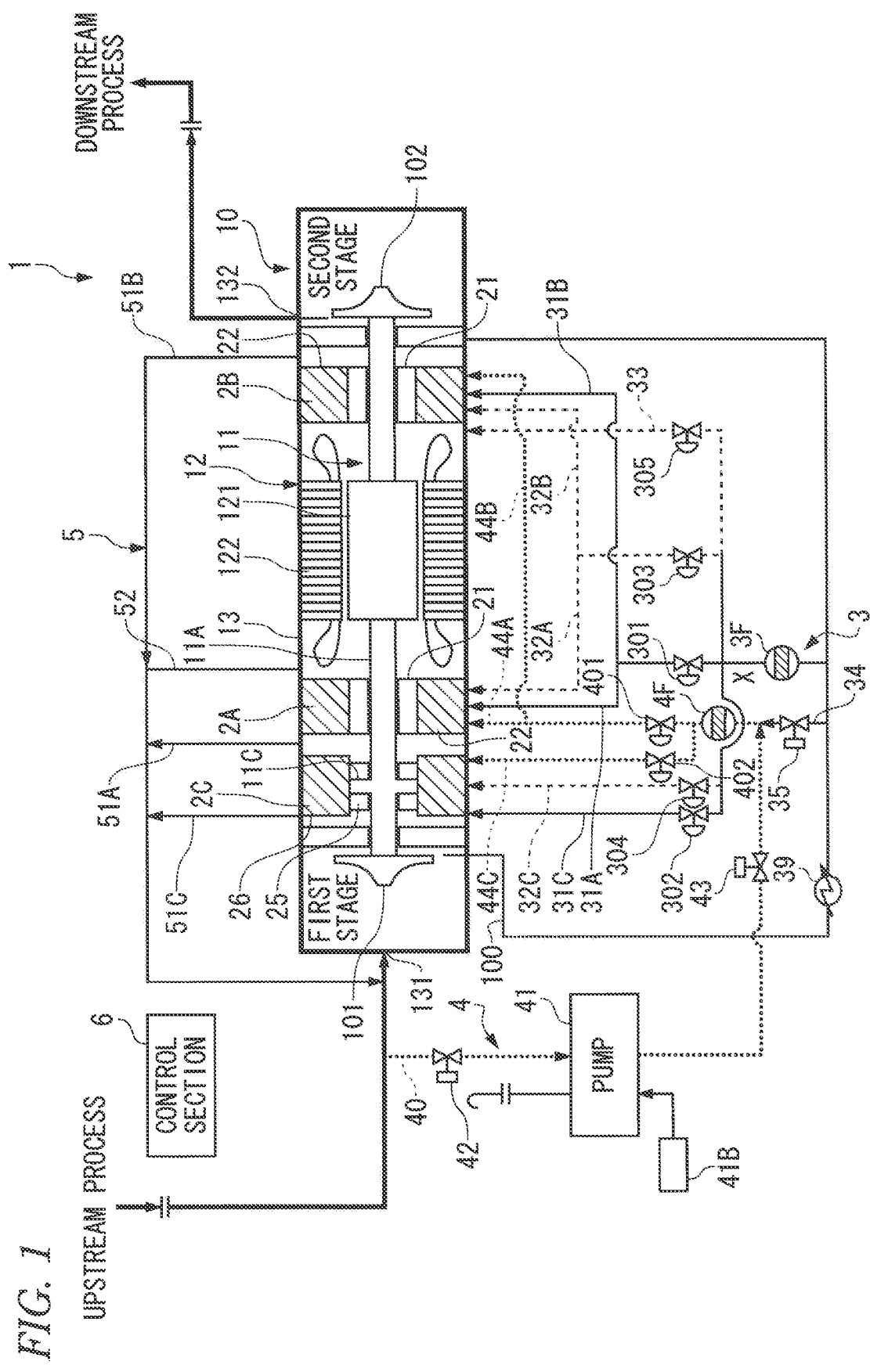
FIG. 1 is a schematic diagram illustrating a configuration of a compressor system according to one or more embodiments of the invention.

A compressor system 1 illustrated in FIG. 1 includes a compressor 10, a bleed gas supply system 3, an external gas supply system 4 (external gas supply system for static pressure), a recycle system 5, and a control section 6. The compressor 10 includes gas bearings 2A to 2C. The bleed gas supply system 3 and the external gas supply system 4 are systems to supply gas to the gas bearings 2A to 2C.

The compressor system 1 configures facilities such as a plant, together with processes on upstream and downstream thereof.

In FIG. 1, illustration of meters and gauges such as a pressure sensor and a temperature sensor is omitted.

The compressor 10 includes a rotor 11, a motor 12, a vehicle compartment 13, journal bearings 2A and 2B, and a thrust bearing 2C. The motor 12 provides rotational driving force to the rotor 11. The vehicle compartment 13 houses the rotor 11 and the motor 12. The bearings 2A, 2B, and 2C are all gas bearings to which gas is supplied in one or more embodiments.

The rotor 11 includes compression sections 101 and 102 that compress sucked gas. The compression section 101 (first stage) that is located on one end side of the rotor 11 incudes one or a plurality of impellers that compress the gas by action of centrifugal force. The impellers are fixed around a rotary shaft 11A of the rotor 11.

Likewise, the compression section 102 that is located on the other end side of the rotor 11 also includes one or a plurality of impellers. The compression section 102 (second stage) sucks and compresses the gas that has been pressurized by the compression section 101. The gas discharged from the compression section 101 is introduced into the compression section 102 through a pressurized gas line 100.

The motor 12 is built in the vehicle compartment 13 and is disposed between the compression section 101 and the compression section 102. The motor 12 includes a motor rotor 121 and a stator 122. The motor rotor 121 is fixed to the rotary shaft 11A, and the stator 122 surrounds the motor rotor 121. When a coil provided in the stator 122 is energized, the motor rotor 121 rotates with respect to the stator 122, and the rotor 11 including the compression sections 101 and 102 is entirely rotated by the rotational driving force provided to the rotary shaft 11A.

The vehicle compartment 13 includes an introduction section 131, and a discharge section 132. The introduction section 131 introduces the gas (process gas) supplied from the upstream process, into the compression section 101. The discharge section 132 discharges the gas pressurized through the compression sections 101 and 102, to the downstream process.

The vehicle compartment 13 in one or more embodiments also serves as a casing of the motor 12.

The journal bearings 2A and 2B are respectively located on both sides of the motor 12 in an axial direction of the rotary shaft 11A that extends in a horizontal direction, and rotatably supports the rotary shaft 11A about the axis.

The journal bearing 2A includes a plurality of strip-like pads 21 (also see FIG. 2) and a housing 22 holding the pads 21. Each of the pads 21 is curved so as to follow an outer peripheral surface of the rotary shaft 11A.

Dynamic pressure is generated in the gas that is caught between the rotating rotary shaft 11A and the pads 21, which floats the rotor 11 against the own weight. This makes it possible to support the rotor 11 in a non-contact state with the pads 21. The dynamic pressure, however, depends on a rotation number (rotation speed) of the rotor 11. Therefore, to reliably support the rotor 11 also when the rotation number is low, the process gas is sufficiently supplied between an inner peripheral surface of each of the pads 21 and the outer peripheral surface of the rotary shaft 11A, and floating of the rotor 11 is assisted by the pressure (static pressure) of the process gas.

A size of a gap (gap amount) between the inner peripheral surface of each of the pads 21 and the outer peripheral surface of the rotary shaft 11A is, for example, about 10 μm.

As described later, bleed gas from the gas pressurized by the compression section 101 is supplied to the journal bearing 2A to apply the dynamic pressure to the journal bearing 2A, and external gas and the bleed gas are supplied to apply the static pressure to the journal bearing 2A.

Figure 2:
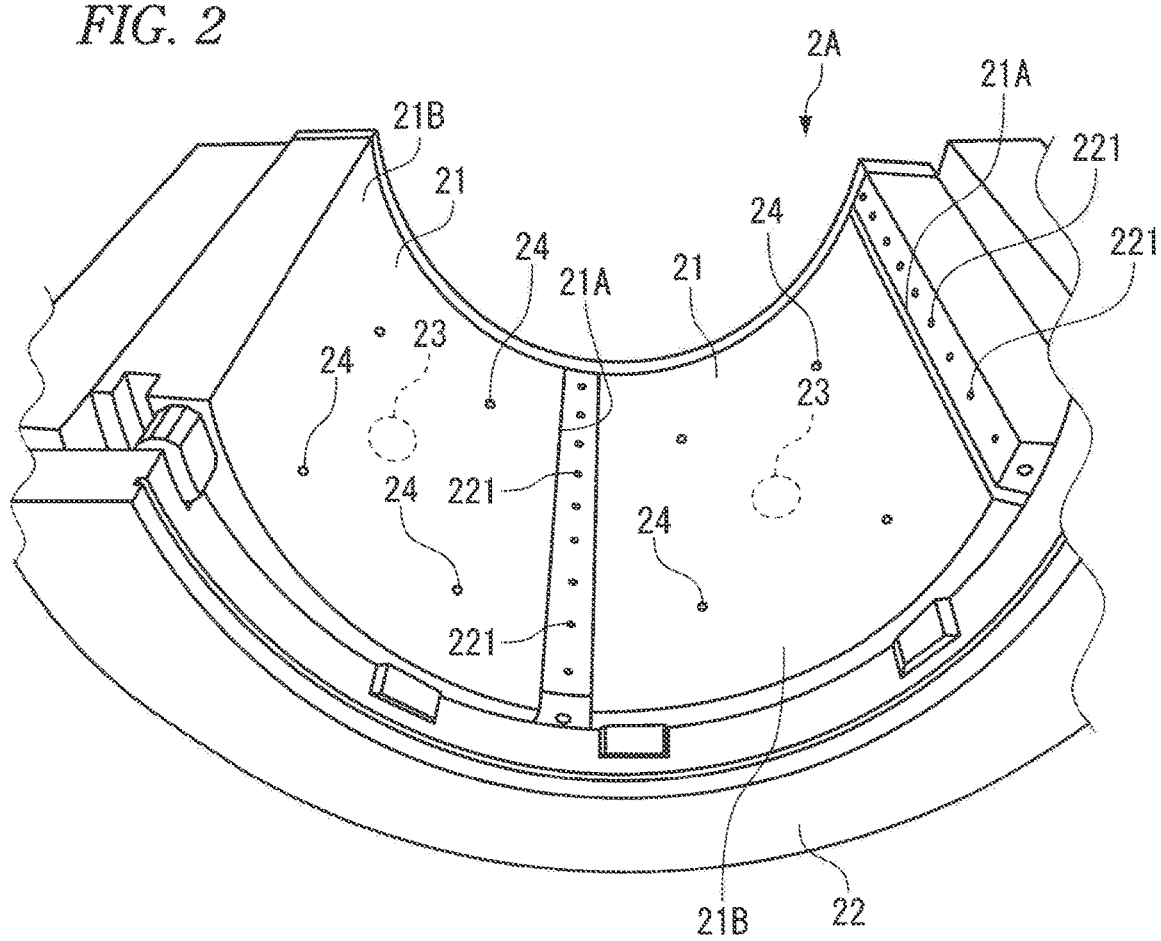
FIG. 2 is a diagram schematically illustrating pads of respective gas bearings and a housing.

FIG. 2 illustrates one (lower body) of half-split bodies of the journal bearing 2A, and the pads 21 are supported by the housing 22 so as to be swingable around a pivot 23 that is located at a center of a flat surface.

A plurality of gas supply ports 221 for dynamic pressure are provided on the housing 22 along an end rim 21A of each of the pads 21. The gas (bleed gas) that is supplied from each of the gas supply ports 221 for dynamic pressure toward the rotary shaft 11A is caught, together with the gas flowing near each of the pads 21 along with the rotation of the rotor 11, to the gap between each of the pads 21 and the rotary shaft 11A, to generate the dynamic pressure, and the rotor 11 is floated by the dynamic pressure. At this time, when the gas is caught, each of the pads 21 swings. Therefore, it is possible to more efficiently generate the dynamic pressure by wedge action, and to accordingly float the rotor 11.

A plurality of gas supply ports 24 for static pressure that are distributed on the flat surface of each of the pads 21 are provided on each of the pads 21 and the housing 22. Even if the rotor 11 is not rotating, the rotor 11 is floated by the pressure of the gas that is ejected from each of the gas supply ports 24 for static pressure toward the rotary shaft 11A facing a surface 21B of each of the pads 21.

A supply port (not illustrated) of the gas that is supplied to rear side of each of the pads 21 in order to suppress temperature increase of each of the pads 21 is provided in the housing 22.

The journal bearing 2B (FIG. 1) also includes the plurality of pads 21 and the housing 22, as with the journal bearing 2A.

The thrust bearing 2C (FIG. 1) supports the one end side of the rotary shaft 11A in a thrust direction. The thrust bearing 2C includes pads 25 and a housing 26. The pads 25 are respectively disposed on both sides of a flange 11C provided on the rotary shaft 11A, and the housing 26 holds the pads 25.

Pressure (static pressure) of the gas supplied between each of the pads 25 and the flange 11C or dynamic pressure generated in the gas that is caught between the flange 11C and each of the pads 25 along with the rotation of the rotary shaft 11A acts on the flange 11C from both sides thereof. As a result, the rotor 11 is supported in the thrust direction while the flange 11C and the pads 25 on both sides of the flange 11C are not in contact with each other.

As described later, the bleed gas is also supplied to the thrust bearing 2C to apply the dynamic pressure to the thrust bearing 2C, and the external gas or the bleed gas is also supplied to the thrust bearing 2C to apply the static pressure. Further, gas is supplied to each of the pads 25 of the thrust bearing 2C to suppress temperature increase.

The compressor system 1 generally includes, as systems through which the gas flows, the bleed gas supply system 3 (FIG. 1 and FIG. 3), the external gas supply system 4 (FIG. 1 and FIG. 4), and the recycle system 5 (FIG. 1).

(Bleed Gas Supply System)

Figure 3:
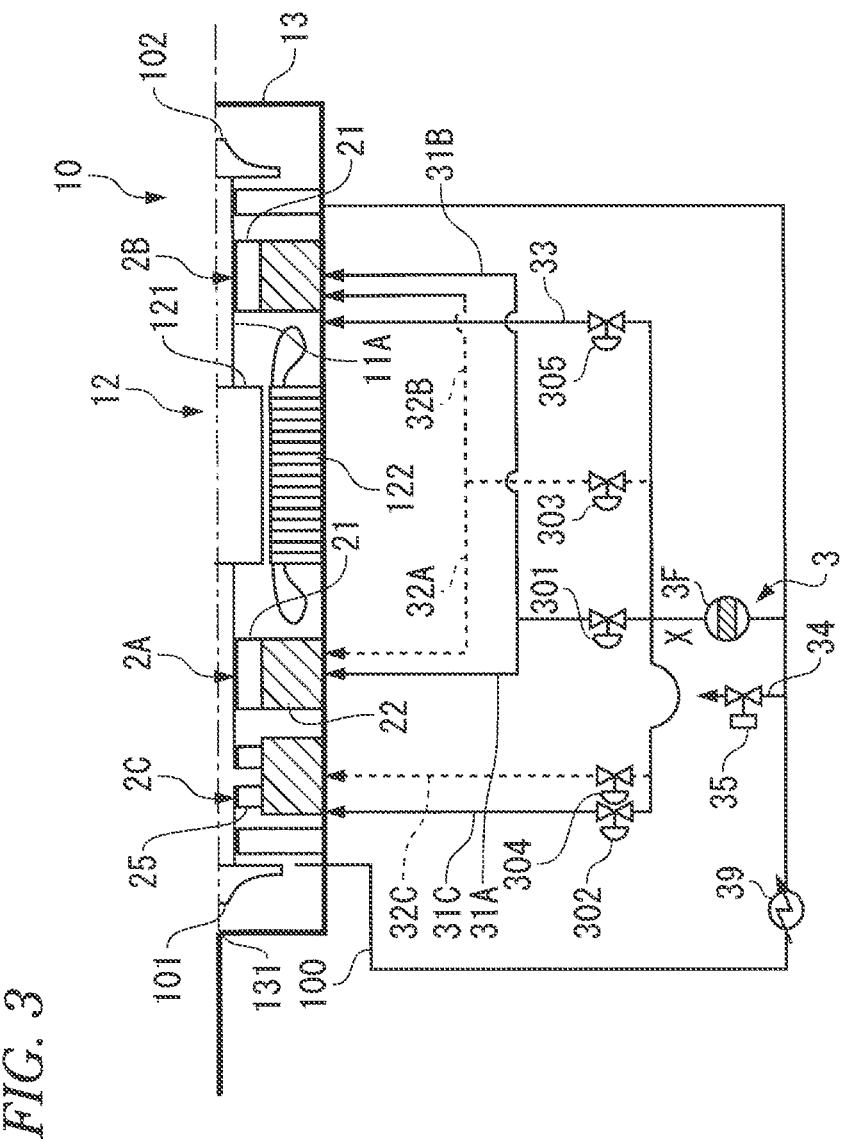
FIG. 3 is a diagram illustrating a bleed gas supply system of the compressor system illustrated in FIG. 1.
Figure 4:
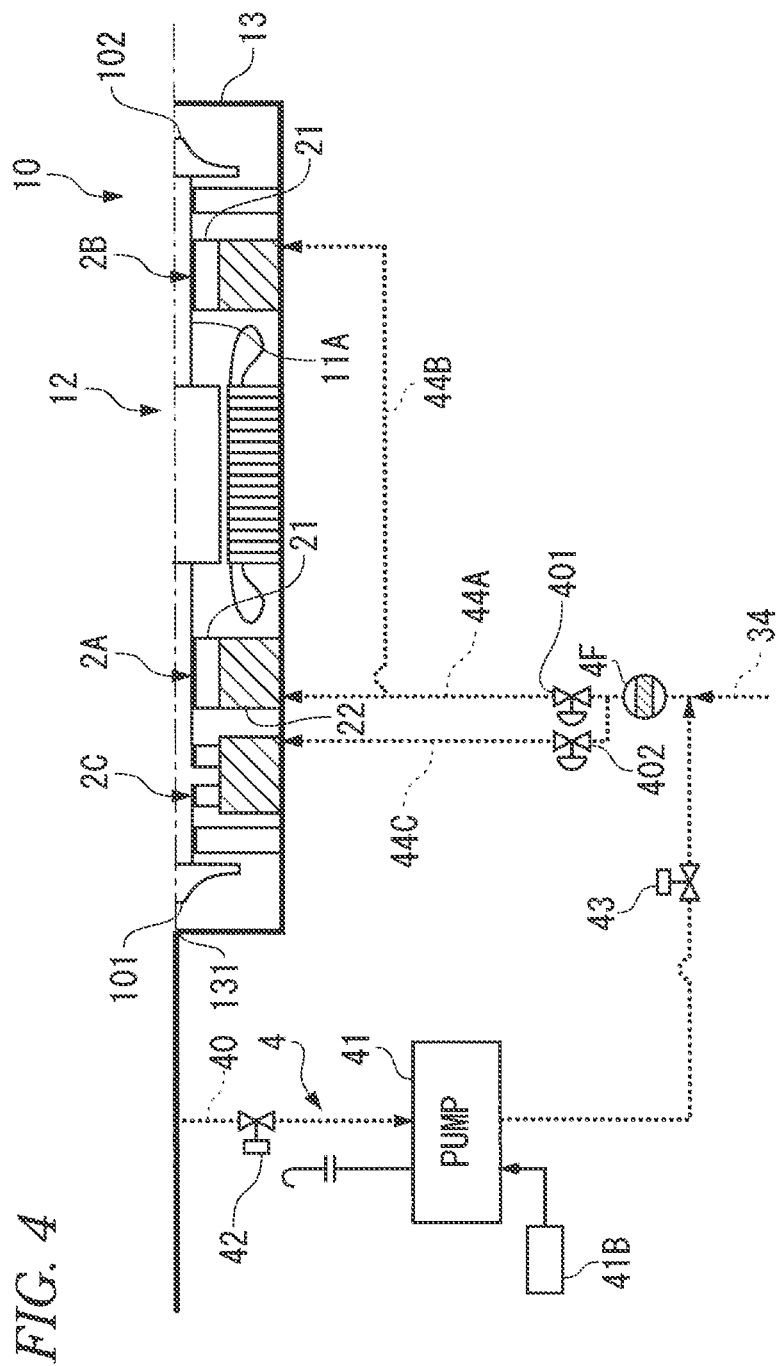
FIG. 4 is a diagram illustrating an external gas supply system of the compressor system illustrated in FIG. 1.

As illustrated in FIG. 3, the bleed gas supply system 3 includes a filter 3F, dynamic pressure generating lines 31A to 31C, and regulation valves 301 and 302. The filter 3F removes foreign matters from the bleed gas. The dynamic pressure generating lines 31A to 31C are branched on downstream of the filter 3F. The bleed gas supply system 3 possibly includes pad cooling lines 32A to 32C illustrated by dashed lines, a motor cooling line 33, and a bleed-gas static-pressure assisting line 34.

The dynamic pressure generating lines 31A to 31C respectively supply, to the gas bearings 2A to 2C, bleed gas as a portion of the pressurized gas that has been compressed by the compression section 101.

The dynamic pressure generating lines 31A to 31C are connected to the pressurized gas line 100 through the filter 3F to cause a portion of the gas flowing through the pressurized gas line 100 to flow into the dynamic pressure generating lines 31A to 31C as the bleed gas.

The dynamic pressure generating lines 31A and 31B respectively correspond to the journal bearings 2A and 2B, and the dynamic pressure generating line 31C corresponds to the thrust bearing 2C. The dynamic pressure generating lines 31A and 31B and the dynamic pressure generating line 31C are branched at a branch point X.

The dynamic pressure generating line 31A communicates with the gas supply port 221 for dynamic pressure (FIG. 2) of the journal bearing 2A, and the dynamic pressure generating line 31B communicates with the gas supply ports 221 for dynamic pressure of the journal bearing 2B. The dynamic pressure generating line 31C communicates with unillustrated gas supply ports for dynamic pressure of the thrust bearing 2C.

The regulation valve 301 that allows for adjustment of a flow rate of the gas flowing through the dynamic pressure generating lines 31A and 31B and the regulation valve 302 that allows for adjustment of a flow rate of the gas flowing through the dynamic pressure generating line 31C are provided on the downstream of the branch point X.

Opening of the regulation valve 301 may be controlled on the basis of pressure difference between the pressure of the gas flowing into the gas supply ports 221 for dynamic pressure of each of the journal bearings 2A and 2B and atmospheric pressure near the gas supply ports 221 for dynamic pressure from which the gas flows out, or on the basis of the flow rate of the gas flowing through the gas supply ports 221 for dynamic pressure.

Likewise, opening of the regulation valve 302 may be controlled on the basis of pressure difference between the pressure of the gas flowing into the gas supply ports for dynamic pressure of the thrust bearing 2C and atmospheric pressure near the gas supply ports for dynamic pressure from which the gas flows out, or on the basis of the flow rate of the gas flowing through the gas supply ports for dynamic pressure.

As illustrated in FIG. 3, the pad cooling line 32A communicates with rear side of each of the pads 21 of the journal bearing 2A, the pad cooling line 32B communicates with rear side of each of the pads 21 of the journal bearing 2B, and the pad cooling line 32C communicates with rear side of each of the pads 25 of the thrust bearing 2C. The pads are cooled by the gas that is supplied from a supply port of the housing of each bearing to the rear side of each of the pads through the pad cooling lines 32A to 32C. This suppresses deformation of each of the pads, and secures load capacity of each of the bearings.

Note that the gas supplied from the gas supply ports 221 for dynamic pressure and the gas supplied from the gas supply ports 24 for static pressure (FIG. 2) described above also contribute to cooling of the pads.

A regulation valve 303 that allows for adjustment of the flow rate of the gas flowing through the pad cooling lines 32A and 32B and a regulation valve 304 that allows for adjustment of the flow rate of the gas flowing through the pad cooling line 32C are provided on the downstream of the filter 3F.

Opening of each of the regulation valves 303 and 304 may be controlled on the basis of the temperature of the pads detected with use of a temperature sensor (not illustrated) such as a thermocouple and a thermistor.

The bleed gas drawn from the pressurized gas line 100 is supplied, as the gas at temperature contributing to cooling, to the pads of each of the gas bearings 2A to 2C through the filter 3F and one of the regulation valves 303 and 304.

To improve efficiency of cooling, a gas cooler 39 that decreases the temperature of the bleed gas through heat exchange with a cooling medium such as air and water is possibly provided in the pressurized gas line 100.

The position of the gas cooler 39 illustrated in FIG. 1 and FIG. 3 is illustrative, and the gas cooler 39 may be disposed, for example, on the upstream of the filter 3F in the bleed gas supply system 3 used for cooling.

The motor cooling line 33 communicates with the vicinity of the motor 12 inside the vehicle compartment 13, and uses the bleed gas to cool the motor rotor 121 and the stator 122, in a manner similar to the pad cooling lines 32A to 32C.

The bleed gas flows through the motor cooling line 33 and is then supplied to the inside of the vehicle compartment 13, and cools the motor rotor 121 and the stator 122 while flowing through the gap between the motor rotor 121 and the stator 122, and through cutouts provided in the stator 122 toward the compression section 101 in the axial direction of the rotor 11, according to pressure gradient inside the vehicle compartment 13.

A regulation valve 305 that allows for adjustment of the flow rate is provided in the motor cooling line 33.

Opening of the regulation valve 305 may be controlled on the basis of the detected temperature of the motor rotor 121 or the stator 122.

A portion of the gas flowing through the pressurized gas line 100 flows into the bleed-gas static-pressure assisting line 34 as the bleed gas. The bleed-gas static-pressure assisting line 34 is connected to static-pressure assisting lines 44A to 44C of the external gas supply system 4 (FIG. 1), and supplies the bleed gas to the gas bearings 2A to 2C through the respective static-pressure assisting lines 44A to 44C.

A control valve 35 that is openable and closable is provided in the bleed-gas static-pressure assisting line 34.

The bleed-gas static-pressure assisting line 34 may be configured so as to supply the bleed gas directly to the gas bearings 2A to 2C without through the static-pressure assisting lines 44A to 44C of the external gas supply system 4.

(External Gas Supply System)

Next, the external gas supply system 4 (FIG. 1 and FIG. 4) supplies external gas that is supplied from outside of the compressor 10, to the gas bearings 2A to 2C in order to obtain an air film that has pressure necessary for supporting the rotary shaft 11A in non-contact with the pads of the gas bearings 2A to 2C.

The external gas supply system 4 includes a process gas line 40 into which the process gas from the upstream process is introduced, a pump device 41, control valves 42 and 43, a filter 4F, and the static-pressure assisting lines 44A to 44C. The pump device 41 forcibly feeds the process gas (external gas) supplied by the process gas line 40. The filter 4F removes foreign matters from the process gas. The static-pressure assisting lines 44A to 44C are branched on the downstream of the filter 4F.

The pump device 41 serving as an external gas supplying source pressurizes the supplied process gas with use of low-pressure driving air 41B as a power source, thereby forcibly feeding the pressurized process gas to the gas bearings 2A to 2C.

As described later, the external gas supply system 4 is intermittently used in response to operation of the control valves 42 and 43. Therefore, as the pump device 41, adopting an inexpensive pump even having a short product lifetime, such as a reciprocating pump is economical.

The control valve 42 is provided in the process gas line 40, and the control valve 43 is provided on the downstream of the pump device 41.

The static-pressure assisting lines 44A and 44B respectively correspond to the journal bearings 2A and 2B, and the static-pressure assisting line 44C corresponds to the thrust bearing 2C.

The static-pressure assisting line 44A communicates with the gas supply ports 24 for static pressure (FIG. 2) of the journal bearing 2A, and the static-pressure assisting line 44B communicates with the gas supply ports 24 for static pressure of the journal bearing 2B. The static-pressure assisting line 44C communicates with the unillustrated gas supply ports for static pressure of the thrust bearing 2C.

A regulation valve 401 that allows for adjustment of the flow rate is provided for the static-pressure assisting lines 44A and 44B. A regulation valve 402 that allows for adjustment of the flow rate is provided also in the static-pressure assisting line 44C.

Opening of the regulation valve 401 may be controlled on the basis of pressure difference between the pressure of the gas flowing into the gas supply ports 24 for static pressure of each of the journal bearings 2A and 2B and atmospheric pressure near the gas supply ports 24 for static pressure from which the gas flows out, or on the basis of the flow rate of the gas flowing through the gas supply ports 24 for static pressure.

Likewise, opening of the regulation valve 402 may be controlled on the basis of pressure difference between the pressure of the gas flowing into the gas supply ports for static pressure of the thrust bearing 2C and atmospheric pressure near the gas supply ports for static pressure from which the gas flows out, or on the basis of the flow rate of the gas flowing through the gas supply ports for static pressure.

The control valve 35 that is provided in the bleed-gas static-pressure assisting line 34 (FIG. 3) of the bleed gas supply system 3 is opened, which causes the bleed gas to flow into the static-pressure assisting lines 44A to 44C from the bleed-gas static-pressure assisting line 34, and the bleed gas is supplied to the gas bearings 2A to 2C through the respective static-pressure assisting lines 44A to 44C.

(Recycle System)

As described above, the gas that has been supplied to the gas bearings 2A to 2C and the motor 12 by the bleed gas supply system 3 and the external gas supply system 4 is returned to the upstream of the compressor 10 through the recycle system 5 (FIG. 1) and is introduced into the compression section 101.

The recycle system 5 includes bearing recycle lines 51A to 51C and a motor recycle line 52.

The bearing recycle lines 51A to 51C causes the gas that has contributed to supporting of the rotor 11 or cooling of the pads in each of the gas bearings 2A to 2C, to flow out to the outside of the vehicle compartment 13.

The motor recycle line 52 causes the gas that has cooled the motor rotor 121 and the stator 122 while flowing the gap between the motor rotor 121 and the stator 122 and the like toward the compression section 101, to flow out to the outside of the vehicle compartment 13.

The control section 6 (FIG. 1) controls operation of each of the regulation valves 301 to 305 and the control valve 35 that are provided in the bleed gas supply system 3, and the regulation valves 401 and 402 and the control valves 42 and 43 that are provided in the external gas supply system 4.

The processes from startup to stoppage of the compressor 10 relating to supply of the gas to the compressor 10 are now described.

Figure 5:
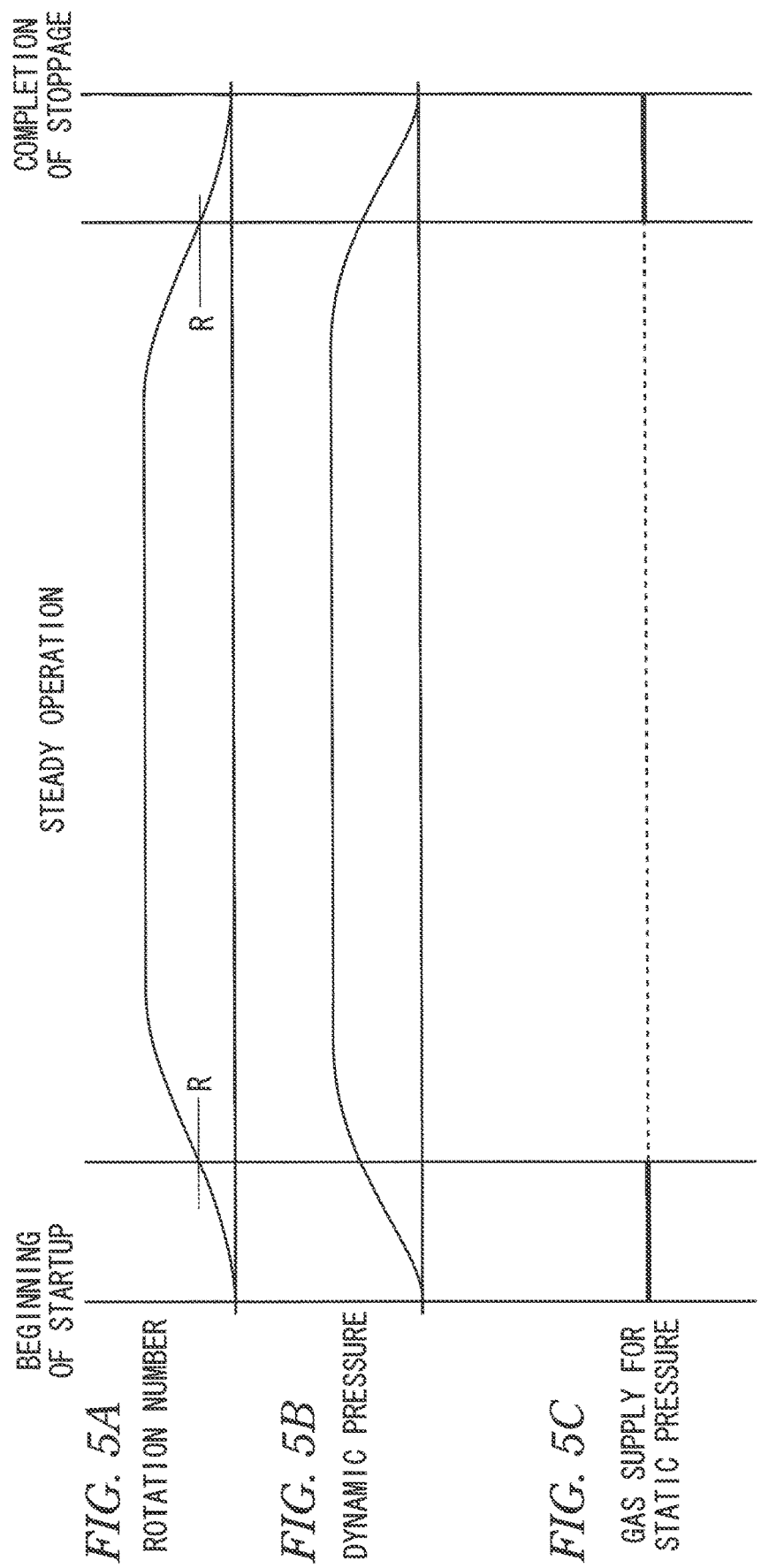
FIGS. 5A to 5C are a diagram to explain an example of a process of a method of supplying gas according to one or more embodiments of the invention.

FIG. 5A illustrates a rotation number (rotation speed) of the rotor 11 from beginning of the startup to completion of the stoppage of the compressor 10. FIG. 5B schematically illustrates the dynamic pressure generated in the gas bearings 2A and 2B along with rotation of the rotor 11.

The rotation number of the rotor 11 is low for a while after beginning of the startup of the compressor 10. Therefore, the dynamic pressure generated in the gas bearings 2A and 2B is small and is insufficient to rotatably support the rotor 11. In addition, if the rotation number of the rotor 11 is decreased in the stoppage of the compressor 10, the dynamic pressure generated in the gas bearings 2A and 2B becomes insufficient.

Note that, also as for the gas bearing 2C, if the rotation number is decreased in the startup or in the stoppage, the dynamic pressure becomes insufficient to support the rotor 11 in the thrust direction.

A prescribed rotation number that reliably provides, to the gas bearings 2A to 2C, the dynamic pressure sufficient to support the rotor 11 is referred to as a dynamic-pressure satisfaction rotation number R. When the rotation number of the rotor 11 is lower than the dynamic-pressure satisfaction rotation number R (period illustrated by thick line in FIG. 5C), it is necessary to assist the support of the rotor 11 of the dynamic pressure by the static pressure of the gas that is supplied to the gas bearings 2A to 2C with sufficient pressure.

An example of a procedure of the method of supplying gas according to one or more embodiments is described below with reference to FIG. 6.

The control section 6 activates the pump device 41 to start the supply of the gas to the gas bearings 2A to 2C, namely, to start assistance by the static pressure (step S10) before acceleration of the compressor 10 is started in response to power supply to the motor 12 (step S11).

The control valves 42 and 43 are opened by the control section 6 in order to perform the assistance with use of the process gas (external gas) supplied from the upstream process. The process gas that has been supplied from the upstream process to the process gas line 40 is forcibly fed to the gas bearings 2A to 2C by the pump device 41 through the static-pressure assisting lines 44A to 44C, thereby supporting the rotor 11 in a non-contact state.

At this time, to supply the external gas with the pressure necessary for supporting the rotor 11, the control section 6 adjusts the opening of the regulation valve 401 for the journal bearings 2A and 2B, and the opening of the regulation valve 402 for the thrust bearing 2C.

The gas flowing out from the gas bearings 2A to 2C is collected respectively through the bearing recycle lines 51A to 51C and the collected gas is sucked to the compression section 101. The gas after cooling the pads of the gas bearings 2A to 2C is also sucked to the compression section 101. The gas after cooling the motor 12 flows through the motor recycle line 52, and is merged with the outflow gas from the bearings 2A to 2C.

The control section 6 continues the assistance by the static pressure until the detected rotation number of the rotor 11 reaches the prescribed dynamic-pressure satisfaction rotation number R (N in step S12). During the period, the dynamic pressure generated by the bleed gas that is supplied from the compression section 101 to the gas bearings 2A to 2C through the pressurized gas line 100 and the dynamic pressure generating lines 31A to 31C is gradually increased with the increase of the rotation number. Therefore, the supply pressure of the static pressure for the assistance may be decreased by adjusting the flow rate of the external gas by the regulation valves 401 and 402.

When the rotation number of the rotor 11 becomes equal to or higher than the dynamic-pressure satisfaction rotation number R (Y in step S12), the control section 6 stops the pump device 41 to stop the supply of the external gas to the gas bearings 2A to 2C (step S13). The control valves 42 and 43 are also closed.

At this time, the pressure sufficient to support the rotor 11 is reliably provided to the gas bearings 2A to 2C only by the dynamic pressure along with the rotation of the rotor 11 even without the assistance by the static pressure.

Thereafter, when the rotation number of the rotor 11 is increased to a predetermined operation rotation number, the startup of the compressor 10 is completed and the compressor 10 shifts to steady operation. The rotation number of the rotor 11 is continuously detected (step S14).

In this case, the control section 6 or other control device performs control such that the rotation number of the rotor 11 becomes constant (see FIG. 5A); however, the rotation number of the rotor 11 may be controlled to be variable within a predetermined range.

The control section 6 adjusts the opening of the regulation valve 301 for the journal bearings 2A and 2B and the opening of the regulation valve 302 for the thrust bearing 2C so as to supply the bleed gas with the pressure necessary for supporting the rotor 11, to the gas bearings 2A to 2C.

During the operation of the compressor 10, the temperature of the pads of the gas bearings 2A to 2C is increased by heat transmitted from the rotary shaft 11A and the like. In a case where the temperature of the pads detected by the temperature sensor is higher than a prescribed value, the control section 6 opens the regulation valves 303 and 304 to supply the bleed gas to the pads of the gas bearings 2A to 2C through the respective pad cooling lines 32A to 32C, thereby cooling the pads.

The control section 6 opens the regulation valve 303 for the journal bearings 2A and 2B at a necessary degree so as to supply the bleed gas of the flow rate necessary for cooling the pads to avoid deformation of the pads. Likewise, the control section 6 opens the regulation valve 304 for the thrust bearing 2C at a necessary degree. Cooling the pads by the bleed gas at the necessary degree makes it possible to suppress the bleed gas amount and the recycle amount and to maintain efficiency of the compressor system 1.

Note that the temperature of the bleed gas supplied to the bleed gas supply system 3 may be detected and the opening of each of the regulation valves 303 and 304 may be adjusted on the basis of the detected temperature.

In addition, the motor 12 also generates heat during the operation of the compressor 10. In a case where the temperature of the motor rotor 121 and the stator 122 detected by the temperature sensor is higher than a prescribed value, the control section 6 opens the regulation valve 305 to supply the bleed gas to the motor rotor 121 and the stator 122 through the motor cooling line 33, thereby cooling the motor 12.

When the power application to the motor 12 is stopped to stop the compressor 10, the rotation number of the rotor 11 is gradually decreased. When the rotation number of the rotor 11 becomes lower than the rotation number R (Y in step S14), the control section 6 activates the pump device 41 (step S15) and continues the assistance by the static pressure of the external gas until the rotation of the rotor 11 is stopped (Y in step S16) in order to complement the dynamic pressure insufficient for the gas bearings 2A to 2C.

At this time, the control valves 42 and 43 are opened by the control section 6, and the external gas is forcibly fed by the pump device 41 to the gas bearings 2A to 2C through the static-pressure assisting lines 44A to 44C. The flow rate of the external gas is adjusted by the regulation valves 401 and 402 as necessary in order to provide, to the gas bearings 2A to 2C, the static pressure that complements the dynamic pressure gradually decreasing with the decrease of the rotation number.

When the rotation of the rotor 11 is stopped and the operation of the compressor 10 is completely stopped (Y in step S16), the control section 6 stops the pump device 41 to stop the supply of the external gas to the gas bearings 2A to 2C (step S17). The control valves 42 and 43 are also closed.

The gap amount between the rotor 11 and each of the pads may become insufficient or unstable even while the rotation number of the rotor 11 exceeds the dynamic-pressure satisfaction rotation number R.

FIG. 7C illustrates the gap amount that is a floating amount of the rotor 11 with respect to the pads 21 of the gas bearings 2A and 2B. The gap amount corresponds to a distance between the surface of each of the pads 21 and the outer peripheral surface of the rotary shaft 11A.

For example, as illustrated by reference numerals c1 and c2 in FIG. 7C, the gap amount may be varied in some cases. The gap amount between each of the pads of the gas bearing 2C and the flange 11C of the rotor 11 may be similarly varied in some cases. For example, when the rotor 11 in the steady operation can be supported only by the dynamic pressure as long as a normal load is applied, in a case where an excessive load is applied to the gas bearings 2A to 2C due to strong vibration, drastic variation of the flow rate, or the like, the gap amount may become insufficient to stably support the rotor 11.

To eliminate possibility of contact between the rotor 11 and the pads 21 caused by shortage of the gap amount, the gas for static pressure that assists the dynamic pressure is supplied to the gas bearings 2A to 2C also when the gap amount is lower than the prescribed value as periods illustrated by reference numerals d1 and d2 in FIG. 7D.

As an index for assistance by the static pressure, a vibration value of the rotary shaft 11A of the rotor 11 (hereinafter, referred to as shaft vibration value) may be used besides the gap amount. It is sufficient to supply the gas for static pressure to the gas bearings 2A to 2C when the shaft vibration value is larger than a prescribed value.

Another example of the procedure of the method of supplying gas according to one or more embodiments is described below with reference to FIG. 8.

In this example, as with the above-described example, the external gas is supplied to the gas bearings 2A to 2C with use of the pump device 41 (steps S10 to S13) to secure the pressure of the gas sufficient to support the rotor 11 in the gas bearings 2A to 2C during a period from the beginning of the startup of the compressor 10 until the rotation number of the rotor 11 reaches the dynamic-pressure satisfaction rotation number R.

Thereafter, in a case where the gap amount detected by an eddy current range sensor or an electrostatic capacitance range sensor is lower than the prescribed value (Y in step S24), the control section 6 supplies the gas for static pressure (bleed gas in this case) to the gas bearings 2A to 2C to assist the dynamic pressure (step S25).

The motor 12 and the gas bearings 2A to 2C are cooled in a manner similar to the above-described example.

As the gas that is supplied to the gas bearings 2A to 2C for assistance by the static pressure, any of the gas (process gas) supplied from the outside of the compressor 10 and the bleed gas supplied from the compression section 101 can be used.

In this case, the bleed gas is used (step S25). Therefore, the control valve 35 is opened, and the bleed gas that has flown into the bleed-gas static-pressure assisting line 34 from the pressurized gas line 100 is supplied to the gas bearings 2A to 2C.

When the bleed gas is mainly used for the assistance by the static pressure as in step S25, the assistance by the static pressure is not influenced even if the pump device 41 fails.

Besides the above, in a case where the pump device 41 is sound, the external gas fed by the pump device 41 may be used for assistance by the static pressure.

Thereafter, the supply of the gas for static pressure is continued until the supporting state of the rotor 11 is recovered from an unstable state (step S26). When the supporting state of the rotor 11 is recovered from the unstable state (Y in step S26), the supply of the bleed gas for static pressure is ended (step S27), and necessary processes such as closing of the control valve 35 are performed.

A condition to determine whether the supporting state of the rotor 11 has been recovered from the unstable state is appropriately determined. For example, it may be determined whether the gap amount exceeds the prescribed value for a prescribed time period, or whether the shaft vibration value exceeds the prescribed value.

Figure 6:
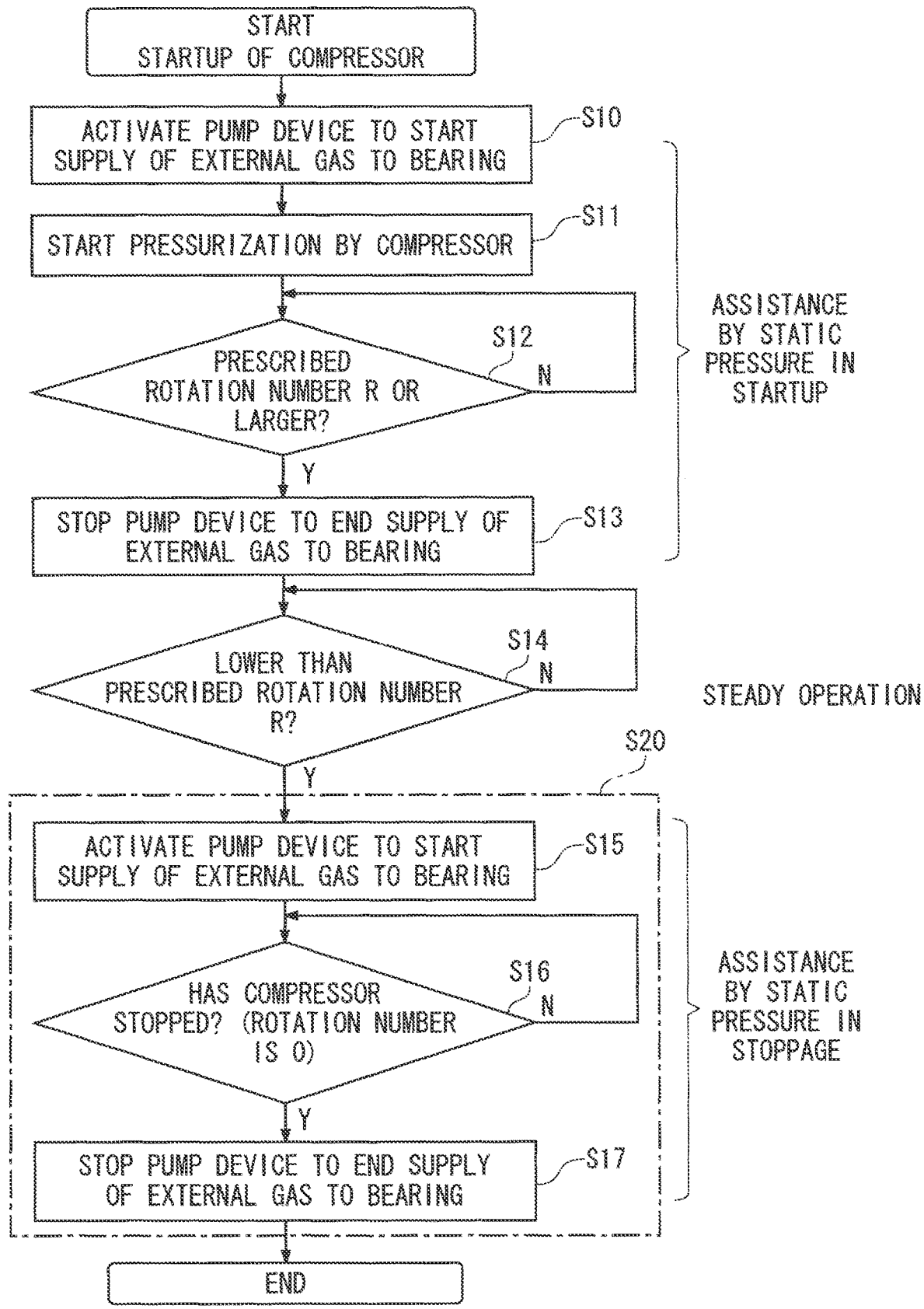
FIG. 6 is a diagram illustrating an example of a procedure of the method of supplying gas according to one or more embodiments of the invention.

When the rotation number of the rotor 11 becomes lower than the prescribed dynamic-pressure satisfaction rotation number R in the stoppage of the compressor 10 (Y in step S28), the external gas is supplied to the gas bearings 2A to 2C with use of the pump device 41 until the compressor 10 is completely stopped (step S20), as with step S20 (steps S15 to S17) in FIG. 6.

According to one or more embodiments described above, the dynamic pressure that tends to become insufficient when the rotation number is low is complemented by the static pressure, which makes it possible to secure the pressure sufficient to support the rotor 11 in the gas bearings 2A to 2C. This makes it possible to improve reliability of the compressor system 1.

Figure 8:
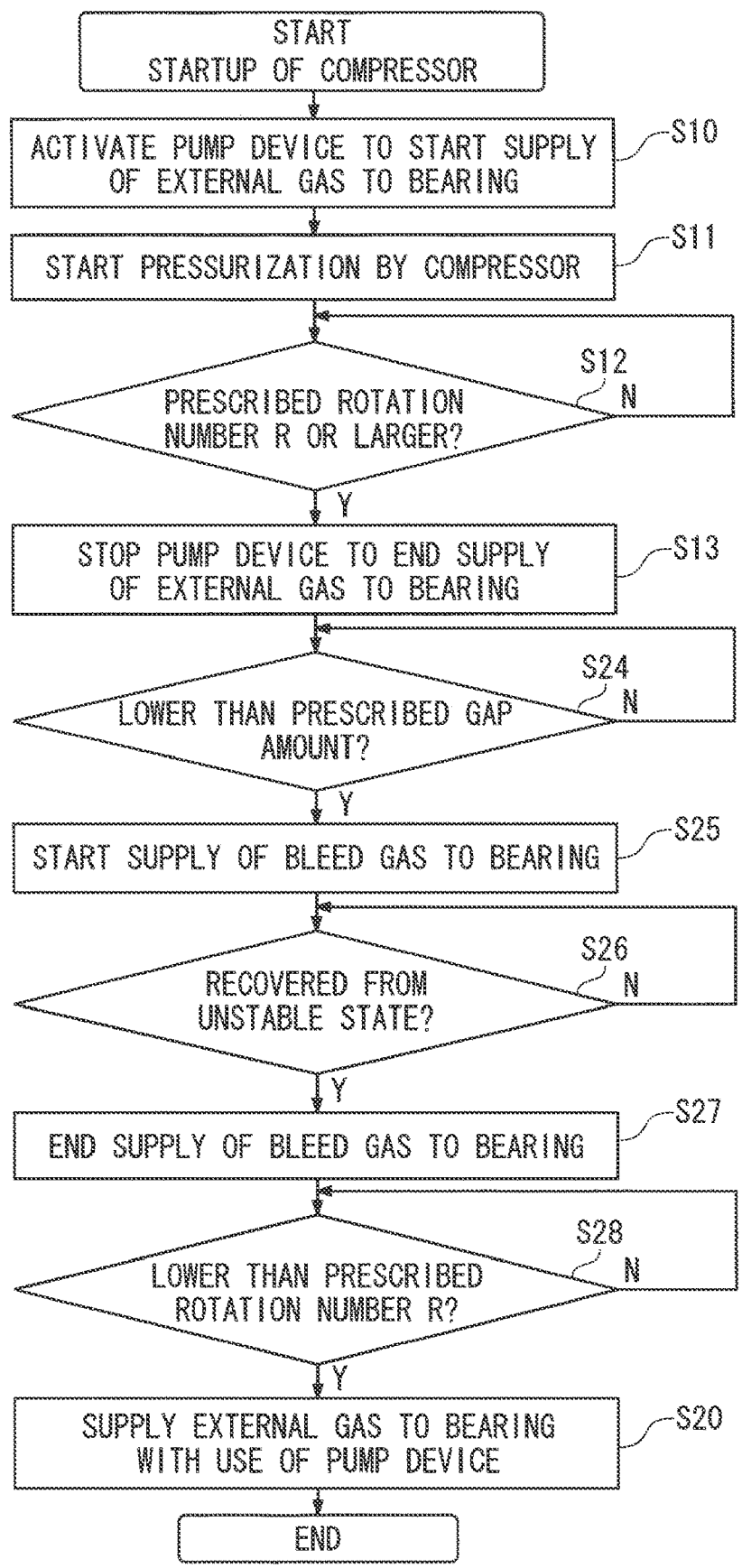
FIG. 8 is a diagram illustrating another example of the procedure of the method of supplying gas according to one or more embodiments of the invention.

In one or more embodiments, when the rotation number is higher than the prescribed dynamic-pressure satisfaction rotation number R, the bleed gas is supplied to the gas bearings 2A to 2C to support the rotor 11 only by the dynamic pressure (step S14 in FIG. 6 and steps S24 to S28 in FIG. 8). In contrast, during the startup and the stoppage in which the rotation number becomes lower than the dynamic-pressure satisfaction rotation number R, the dynamic pressure is assisted by the static pressure of the external gas (steps S10 to S13 and S20 in FIG. 6 and FIG. 8). Accordingly, in one or more embodiments, the pump device 41 that forcibly feeds the external gas intermittently operates only in a portion of the processes from the beginning of the startup to the completion of the stoppage of the compressor 10. This allows for use of the compressor system 1 for a long term even if the pump device 41 having a short product lifetime is used.

Consequently, adopting the inexpensive pump device 41 even having a short product lifetime makes it possible to realize the compressor system 1 that has high reliability and is usable for a long term while suppressing the cost.

In addition, because not the external gas but the bleed gas is used as the gas for cooling the pads of the gas bearings 2A to 2C and the motor 12, it is possible to cool the pads and the motor 12 as necessary irrespective of timing at which the external gas is supplied by the pump device 41 that intermittently operates.

Figure 7:
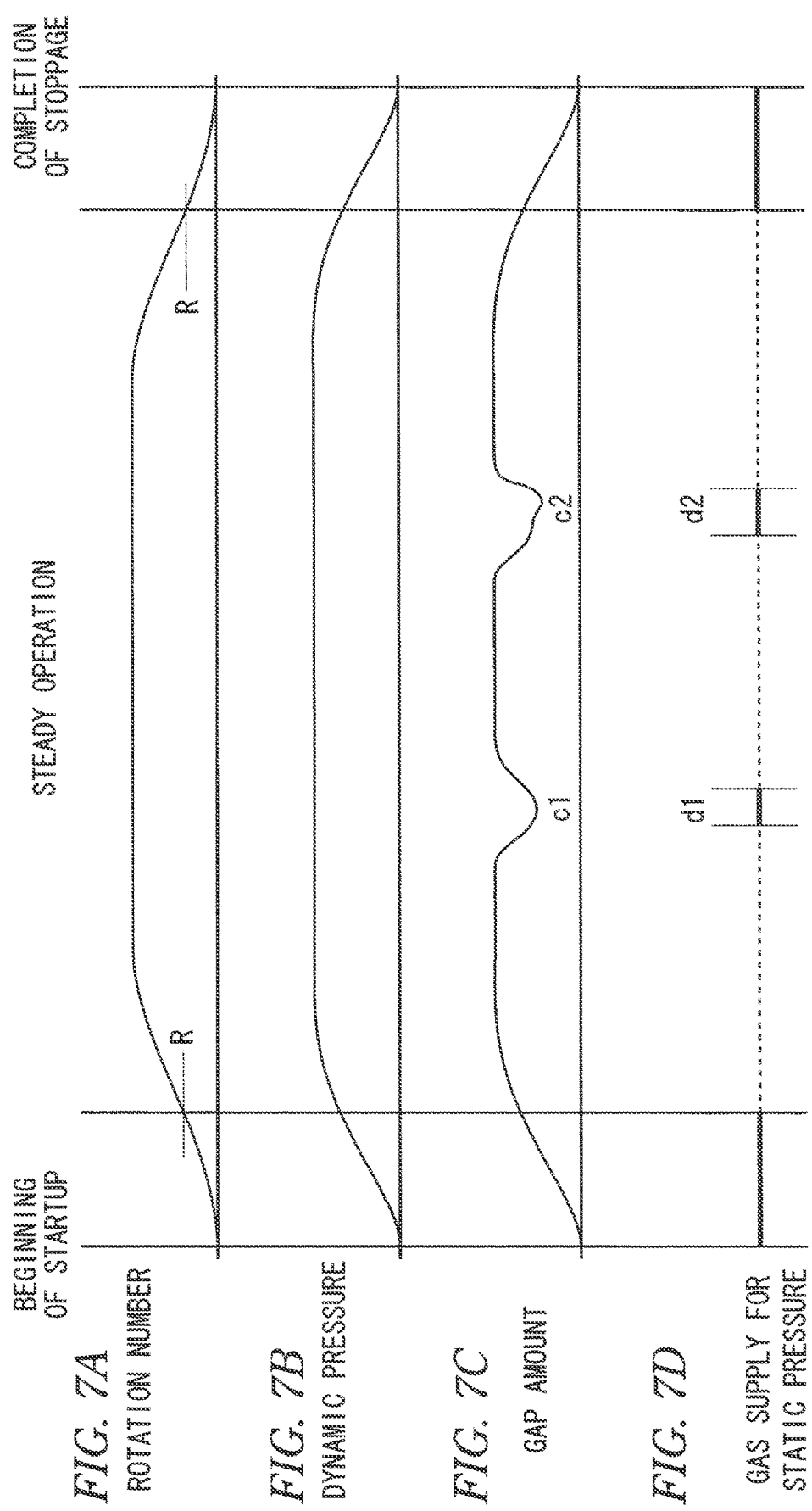
FIGS. 7A to 7D are a diagram to explain another example of the process of the method of supplying gas according to one or more embodiments of the invention.

Further, as illustrated in FIG. 7 and FIG. 8, performing the assistance by the static pressure on the basis of the gap amount or the shaft vibration value makes it possible to stably support the rotor 11 during the operation, thereby further improving the reliability.

The bleed gas from the gas pressurized by the compression section 102 of the second stage may be used for dynamic pressure generation, instead of using, for the dynamic pressure generation, the bleed gas from the gas pressurized by the compression section 101, or together with the gas pressurized by the compression section 101.

In the case where the bleed gas from the gas pressurized by the compression section 102 is used to cool the pads and the motor 12, a gas cooler is provided in a bleed gas supply system (not illustrated) through which the gas pressurized by the compression section 102 flows, in order to reliably decrease the temperature of the pressurized gas.

Next, a compressor system 7 according to one or more embodiments of the present invention is described with reference to FIG. 9 to FIG. 12.

Figure 9:
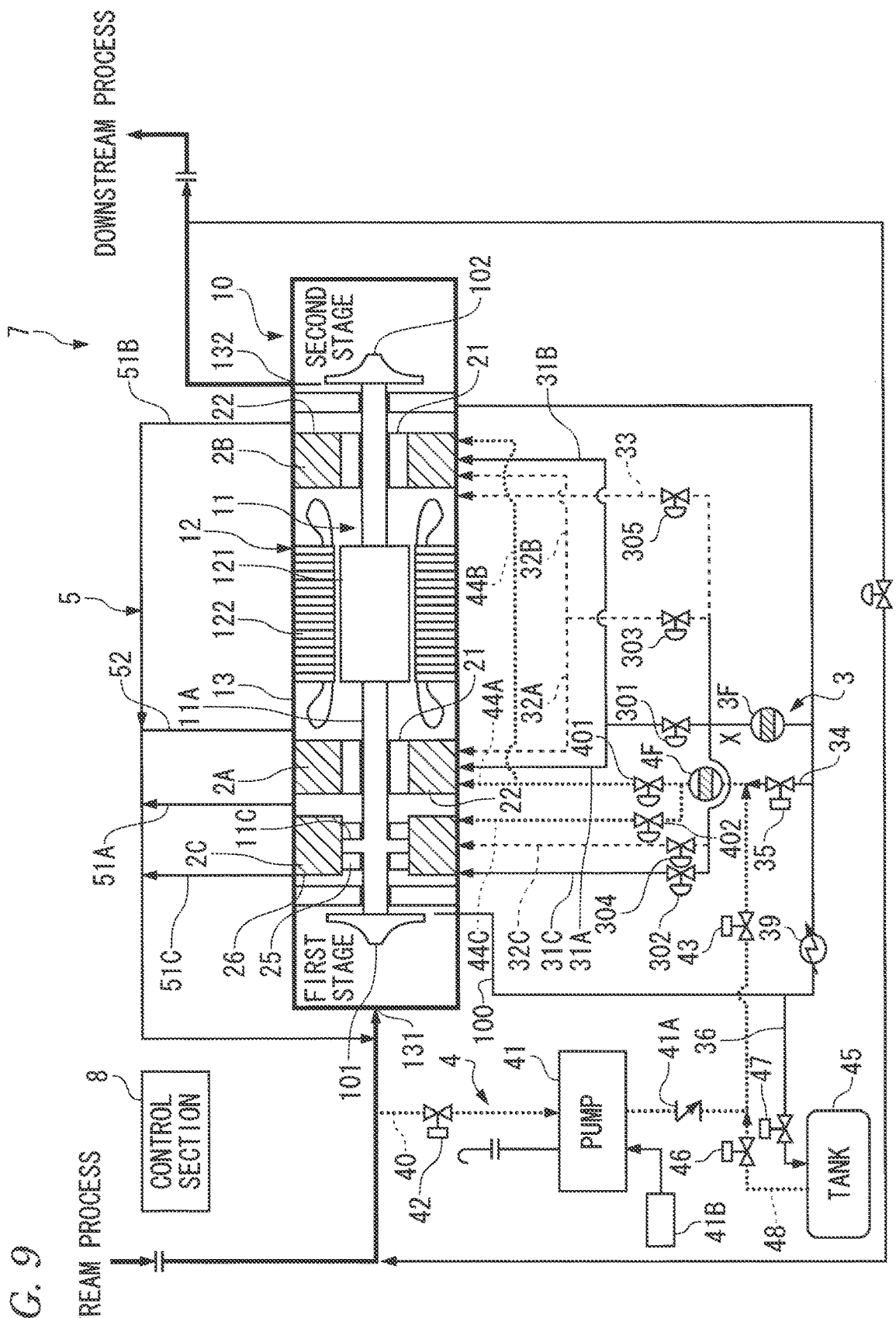
FIG. 9 is a schematic diagram illustrating a configuration of a compressor system according to one or more embodiments of the invention.

The compressor system 7 according to one or more embodiments is different from the compressor system 1 of the above-described embodiments (FIG. 1) in that the compressor system 7 includes a tank 45 as illustrated in FIG. 9. In the following description, differences from the above-described embodiments are mainly described. The components similar to those in the above-described embodiments are denoted by the same reference numerals.

The external gas supply system 4 according to one or more embodiments includes a check valve 41A, the tank 45, and control valves 46 and 47, in addition to the pump device 41, the control valves 42 and 43, and the static-pressure assisting lines 44A to 44C. The tank 45 functions as a backup tank if abnormality occurs on the pump device 41.

The control valves 42, 43, 46 and 47 are opened or closed by a control section 8.

The tank 45 reserves the external gas. The external gas is charged into the tank 45 until the internal pressure of the tank reaches a prescribed internal pressure. The capacity and the internal pressure of the tank 45 are determined such that the gas having pressure sufficient to support the rotor 11 for a necessary time period is covered only by the gas in the tank 45 even if abnormality occurs on the pump device 41 when the static pressure is necessary, for example, in the startup, the stoppage, and the like of the compressor 10.

The tank 45 and the downstream of the pump device 41 are connected to each other through a connection line 48. It is possible to charge the external gas into the tank 45 by the pump device 41 through the connection line 48.

A bleed gas charging line 36 branched from the pressurized gas line 100 is connected to the tank 45. It is also possible to charge the bleed gas into the tank 45 through the bleed gas charging line 36.

Operation examples of the control valves 43, 46, and 47 are described with reference to FIGS. 10A to 10C.

Figure 10A:
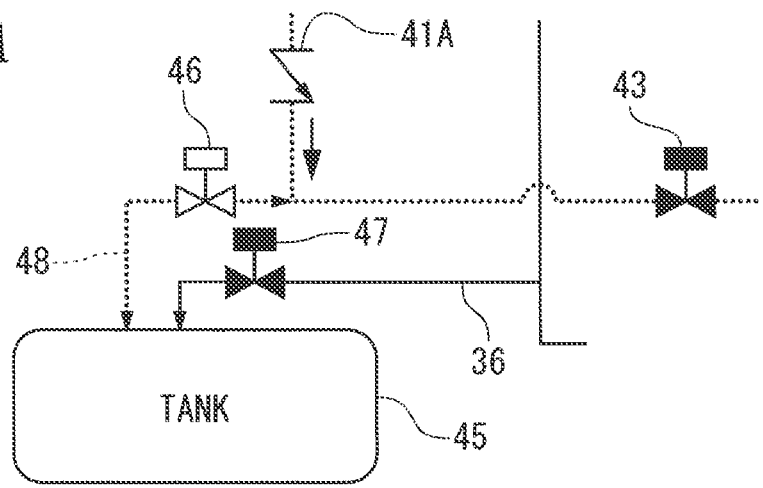
FIGS. 10A to 10C are diagrams illustrating examples of operation of control valves in one or more embodiments of the invention.

When the external gas is charged into the tank 45 by the pump device 41 (FIG. 9), the control section 8 opens the control valve 46 provided in the connection line 48, and closes the control valves 47 and 43 as illustrated in FIG. 10A. In FIGS. 10A to 10C, a closed valve is blackened. Opening both of the control valves 46 and 43 makes it possible to perform charging of the tank 45 by the pump device 41 and the supply of the external gas for static pressure by the pump device 41 simultaneously, depending on the capacity of the pump device 41.

Figure 10B:
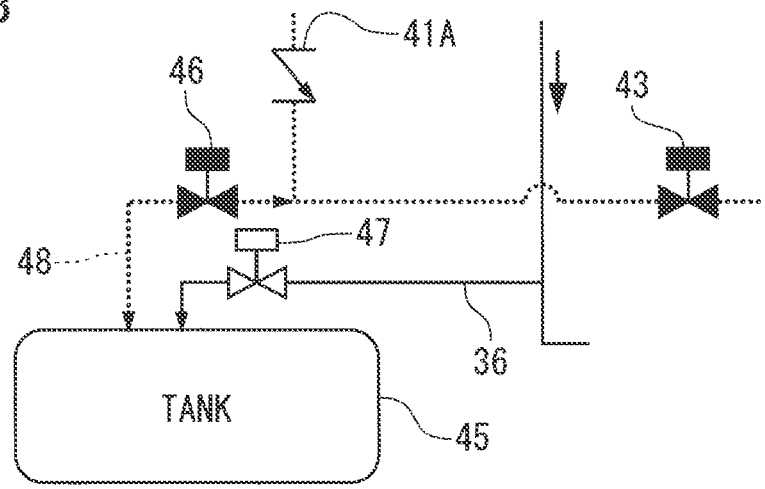

When the bleed gas is charged into the tank 45 through the bleed gas charging line 36, the control valve 47 provided in the bleed gas charging line 36 is opened and the control valves 46 and 43 are closed as illustrated in FIG. 10B.

Figure 10C:
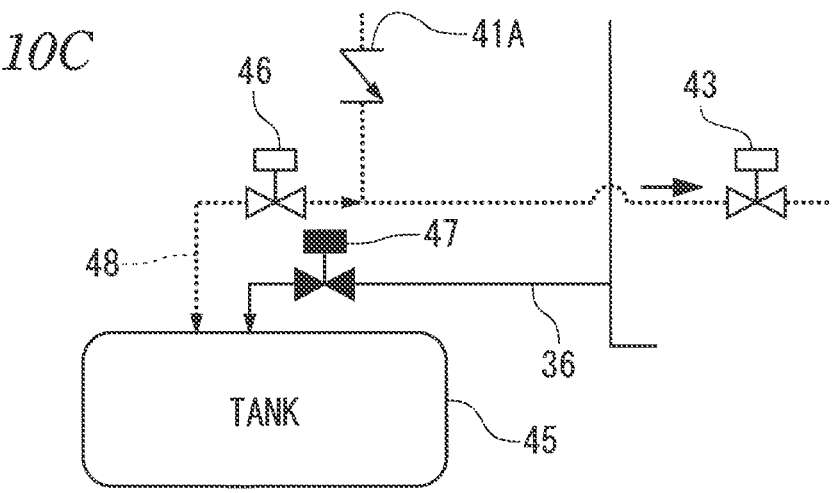

Further, when the gas charged in the tank 45 is used for assistance by static pressure, the control valve 46 and the control valve 43 are opened and the control valve 47 is closed while the pump device 41 is stopped, as illustrated in FIG. 10C. The gas in the tank 45 does not flow back to the pump device 41 because of the check valve 41A.

An example of a procedure of a method of supplying gas that is applied to the compressor system 7 according to one or more embodiments is described below with reference to FIG. 11 and FIG. 12.

In one or more embodiments, the tank 45 and the bleed gas are used as backup when abnormality occurs on the pump device 41.

In one or more embodiments, when the startup of the compressor 10 is started, abnormality occurrence of the pump device 41 is detected as described below (step S31). It is also possible to periodically detect abnormality occurrence of the pump device 41 during the operation of the compressor 10.

Abnormality occurred on the pump device 41 may be detected by the fact that the pressure measured, for example, by a pressure gauge provided in the pump device 41 is low.

Figure 11:
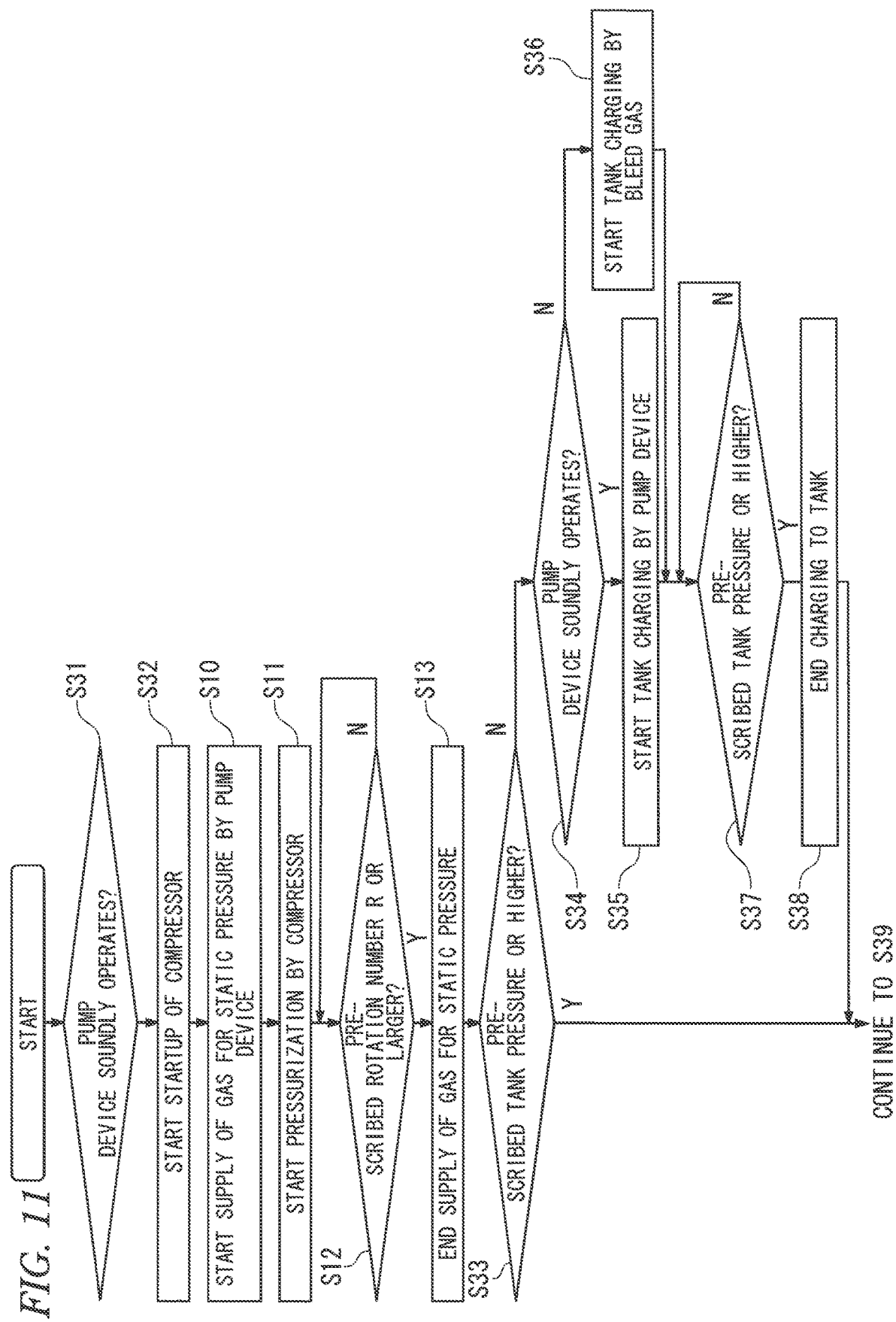
FIG. 11 is a diagram illustrating an example of a procedure of a method of supplying gas according to one or more embodiments of the invention.

As illustrated in FIG. 11, first, it is determined whether the pump device 41 soundly operates (step S31). When abnormality has occurred on the pump device 41 (N in step S31), the startup of the compressor 10 is interrupted.

When the pump device 41 soundly operates (Y in step S31), startup of the compressor 10 is performed (step S23). Thereafter, as with the above-described examples, the external gas is supplied to the gas bearings 2A to 2C with use of the pump device 41 until the rotation number of the rotor 11 reaches the dynamic-pressure satisfaction rotation number R (steps S10 to S13). The control valve 46 is closed.

Further, the gas is charged into the tank 45 until the internal pressure of the tank 45 reaches the prescribed internal pressure, for functioning as the backup (step S33 to S38).

When the pump device 41 soundly operates (Y in step S34), the process gas is charged by the pump device 41 into the tank 45 through the connection line 48 (steps S35, S37, and S38). During the charge, the control valve 46 is opened and the control valve 43 is closed.

When abnormality has occurred on the pump device 41 (N in step S34), the control valve 47 is opened and the control valve 46 is closed to charge the bleed gas into the tank 45 through the bleed gas charging line 36 (steps S36 to S38). At this time, the control valve 43 may be opened to supply the gas for static pressure to the gas bearings 2A to 2C by the pump device 41.

As described above, the pump device 41 and the bleed gas can be used, which improves reliability for charging to the tank 45.

Subsequently, the processing proceeds to processes as illustrated in FIG. 12, the operation is continued while the gap amount (or the shaft vibration value) is detected (step S39).

During the operation, the bleed gas is supplied through the pad cooling lines 32A to 32C and the motor cooling line 33 of the bleed gas supply system 3 to cool the motor 12 and the gas bearings 2A to 2C.

If the gap amount becomes lower than the prescribed value (Y in step S39), the gas for static pressure is supplied to the gas bearings 2A to 2C to start the assistance for dynamic pressure (step S40).

In one or more embodiments, as the gas to be supplied to the gas bearings 2A to 2C for assisting the dynamic pressure by the static pressure, any of the external gas (process gas), the gas in the tank 45, and the bleed gas from the gas pressurized by the compression section 101 can be used.

In this case, when the pump device 41 soundly operates (Y in step S401), the external gas fed by the pump device 41 is used (step S402).

When abnormality has occurred on the pump device 41 (N in step S401), the internal pressure of the tank 45 is detected (step S403). When the internal pressure of the tank 45 is equal to or higher than the prescribed value (Y in step S403), the control valves 46 and 43 are opened (FIG. 10B) and the gas in the tank 45 is used for the assistance by static pressure (step S404).

Note that when abnormality has occurred on the pump device 41, the processing may shift to the process of stopping the compressor 10.

When the internal pressure of the tank 45 is lower than the prescribed value (N in step S403), the control valve 35 is opened and the bleed gas is supplied to the gas bearings 2A to 2C through the bleed-gas static-pressure assisting line 34 (step S405).

It is unnecessary to determine the gas used for the assistance by static pressure in a manner of steps S401 to S405. For example, in the case where the rotation number of the rotor 11 is higher than the prescribed rotation number, the bleed gas may be used, and otherwise, the gas in the tank 45 may be used.

Thereafter, in a manner similar to description in the above-described example (FIG. 8), the supply of the gas for static pressure is continued until the supporting state of the rotor 11 is recovered from the unstable state (step S41). When the supporting state of the rotor 11 is recovered from the unstable state (Y in step S41), the supply of the gas for static pressure is ended (step S42). Necessary processes such as stoppage of the pump device 41 and closing of the control valves 42 and 43 or the control valve 35 are performed depending on the used gas.

Thereafter, as necessary, charging into the tank 45 is performed (steps S33 to S38 in FIG. 11).

When the rotation number of the rotor 11 becomes lower than the prescribed dynamic-pressure satisfaction rotation number R in stoppage of the compressor 10 (Y in step S43), the external gas is supplied to the gas bearings 2A to 2C with use of the pump device 41 until the compressor 10 is completely stopped (step S44), in a manner similar to step S20 (steps S15 to S17) in FIG. 6.

Thereafter, the process gas is charged into the tank 45 by the pump device 41 for next operation (steps S45 to S47).

This makes it possible to supply the gas in the tank 45 to the gas bearings 2A to 2C without operating the pump device 41 in the startup.

Unlike the control example illustrated in FIG. 11 and FIG. 12, the tank 45 may be used relative to the pump device 41.

According to one or more embodiments, in the case where the external gas fed by the pump device 41 is basically used for the assistance by static pressure (step S402) but abnormality such as failure occurs on the pump device 41, the gas charged in the tank 45 is used (step S404). If there is no gas having sufficient pressure in the tank 45, the bleed gas that is obtainable as long as the compressor 10 operates may be used (step S405). Therefore, it is possible to provide, to the system, redundancy that prevents the function of the assistance by static pressure from being lost even when abnormality occurs on the pump device 41, and to accordingly improve reliability of the compressor system 7.

Other than the above, the configurations described in the above-described embodiments may be selected or appropriately modified without departing from the scope of the present invention.

The configurations of the various valves and the lines described in the above-described embodiments are illustrative, and may be appropriately modified and designed.

As the index of the assistance by static pressure in the startup and the stoppage of the compressor 10, the gap amount between the rotor 11 and the pad of the bearing may be used instead of the rotation number of the rotor 11 as illustrated in FIGS. 6, 8, 11, and 12. For example, in a case where the gap amount is lower than the prescribed value in step S12 or S14 in FIG. 6 (Y in step S12 or S14), the gas for static pressure assisting the dynamic pressure is supplied to the gas bearings 2A to 2C.

The thrust bearing 2C is not limited to the gas bearing and may be an oil sliding bearing, a rolling bearing, a magnetic bearing, or other bearing.

The compressor according to one or more embodiments of the present invention is not limited to the compressor including the compression sections 101 and 102 of the first stage and the second stage as with the above-described embodiments, and may be a compressor including a single compression section. In a case of the structure in which both ends of the rotary shaft 11A are supported by gas bearings outside the vehicle compartment 13, the housings of the respective gas bearings may be disposed outside the vehicle compartment 13.

In addition, as the compression section according to one or more embodiments of the present invention, a compression section having an appropriate configuration may be adopted as long as the compression section has a mechanism of compressing gas by rotation of the rotary shaft 11A.

It is unnecessary to provide the motor 12 inside the vehicle compartment 13, and the motor 12 may be disposed outside the vehicle compartment 13. In this case, the motor rotor 121 is coupled to the rotary shaft 11A projecting from the vehicle compartment 13, and the motor rotor 121 and the stator 122 are housed in the casing. To cool the motor 12, it is sufficient to configure a line to feed bleed gas into the casing.

The power source of the compressor according to one or more embodiments of the present invention is not limited to the motor 12, and rotational driving force by an appropriate power source such as a steam turbine may be provided to the rotor 11.

The compressor system according to one or more embodiments of the present invention may include a main pump device and a substitute pump device. The process gas is usually supplied to the gas bearings 2A to 2C with use of the main pump device, and if abnormality occurs on the main pump device, it is possible to change the pump device to the substitute pump device. In this case, it is possible to secure sufficient reliability even if the tank 45 is removed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 compressor system
2A, 2B journal bearing
2C thrust bearing
3 bleed gas supply system
3F filter
4 external gas supply system (external gas supply system for static pressure)
4F filter
5 recycle system
6 control section
7 compressor system
8 control section
10 compressor
11 rotor
11A rotary shaft
11C flange
12 motor
13 vehicle compartment
21 pad
21A end rim
22 housing
23 pivot
24 gas supply port for static pressure
25 pad
26 housing
31A-31C dynamic pressure generating line (dynamic-pressure generating gas supply system)
32A-32C pad cooling line (pad cooling system)
33 motor cooling line (motor cooling system)
34 bleed-gas static-pressure assisting line (gas supply system for bleed gas static pressure)
35 control valve
36 bleed gas charging line (bleed gas charging system)
39 gas cooler
40 process gas line
41 pump device (external gas supply source)
41A check valve
42, 43, 46, 47 control valve
44A-44C static-pressure assisting line
45 tank
48 connection line
51A-51C bearing recycle line
52 motor recycle line
100 pressurized gas line
101, 102 compression section
121 motor rotor
122 stator
131 introduction section
132 discharge section
221 gas supply port for dynamic pressure
301, 302 regulation valve
303, 304 regulation valve
305 regulation valve
401, 402 regulation valve
R dynamic-pressure satisfaction rotation number (dynamic-pressure satisfaction rotation speed)
X branch point

What is claimed is:

1. A compressor system, comprising:
   a compressor that sucks and compresses gas, wherein the compressor comprises:
      a rotor that separates the compressor into a first stage and a second stage; and
      a gas bearing that supports the rotor, wherein the gas bearing comprises:
         dividers disposed on an internal surface of a housing of the gas bearing along a circumferential direction of the gas bearing; and
         a plurality of pads separated by the dividers;
   a pressurized gas line that connects the first stage to the second stage;
   a dynamic-pressure generating gas supply system that supplies bleed gas from the pressurized gas line to a gas supply port for dynamic pressure of the gas bearing via a first flowpath; and
   an external gas supply system for static pressure that supplies external gas from outside of the compressor to a gas supply port for static pressure of the gas bearing via a second flowpath, wherein
   the first flowpath and the second flowpath comprise separate paths to the gas bearing,
   the gas supply port for dynamic pressure is disposed along a surface of the dividers, and
   the gas supply port for static pressure is disposed on the pads of the gas bearing.

2. The compressor system according to claim 1, wherein the external gas supply system for static pressure comprises an external gas supply source that forcibly feeds the external gas.

3. The compressor system according to claim 2, further comprising a tank into which the external gas is chargeable by the external gas supply source.

4. The compressor system according to claim 3, further comprising a bleed gas charging system that charges the bleed gas into the tank.

5. The compressor system according to claim 1, further comprising a gas supply system for bleed gas static pressure that supplies the bleed gas to the gas bearing.

6. The compressor system according to claim 1, further comprising a pad cooling system that supplies the bleed gas to the pads of the gas bearing.

7. The compressor system according to claim 1, further comprising:
   a motor that provides rotational driving force to the rotor; and
   a motor cooling system that connects near the motor inside a casing housing the motor, and supplies the bleed gas to the motor.

8. The compressor system according to claim 6, further comprising a gas cooler that performs heat exchange between the bleed gas and a medium that is lower in temperature than the bleed gas.

9. The compressor system according to claim 1, further comprising a control section that intermittently uses the external gas supply system for static pressure.

10. A method of supplying gas to a compressor including a gas bearing that supports a rotor, the method comprising:
supplying, via a first flow path and to a gas supply port for dynamic pressure of the gas bearing, bleed gas from the gas pressurized by the compressor through a dynamic-pressure generating gas supply system of the compressor system while the rotor rotates;
via a second flow path, supplying external gas from outside of the compressor to a gas supply port for static pressure of the gas bearing through an external gas supply system of the compressor for static pressure or supplying the bleed gas to the gas supply port for static pressure of the gas bearing through the external gas supply system for static pressure, to generate static pressure when:
a rotation speed of the rotor is lower than a prescribed dynamic-pressure satisfaction rotation speed; or
a gap amount between the rotor and a pad of the gas bearing is lower than a prescribed value, wherein wherein
the compressor sucks and compresses gas,
the rotor separates the compressor into a first stage that is connected to a second stage by a pressurized gas line that transports the gas pressurized by the compressor,
the gas bearing comprises:
dividers disposed on an internal surface of a housing of the gas bearing along a circumferential direction of the gas bearing; and
a plurality of pads separated by the dividers,
the first flowpath and the second flowpath comprise separate paths to the gas bearing,
the gas supply port for dynamic pressure is disposed along a surface of the dividers, and
the gas supply port for static pressure is disposed on the pads of the gas bearing.

11. The method of supplying gas according to claim 10, wherein the dynamic-pressure satisfaction rotation speed is a rotation speed in startup or stoppage of the compressor.

12. The method of supplying gas according to claim 10, wherein when the rotation speed of the rotor is higher than the dynamic-pressure satisfaction rotation speed, or when a gap amount between the rotor and the pad of the gas bearing is lower than the prescribed value or a vibration value of a shaft of the rotor is larger than a prescribed value, any of the external gas and the bleed gas is supplied to the gas bearing to generate static pressure.

13. The method of supplying gas according to claim 10, wherein any of the external gas, the bleed gas, and gas in a tank is supplied to the gas bearing to generate static pressure, wherein the external gas is forcibly fed by an external gas supply source outside the compressor, and the tank is in advance charged with the external gas or the bleed gas.

14. The method of supplying gas according to claim 13, wherein the gas in the tank is supplied to the gas bearing in a case where abnormality occurs on the external gas supply source.

15. The method of supplying gas according to claim 10, wherein the pad of the gas bearing is cooled by the bleed gas.

16. The method of supplying gas according to claim 10, wherein a motor that provides rotational driving force to the rotor is cooled by the bleed gas.

17. The compressor system according to claim 1, further comprising:
a motor that drives the rotor,
wherein the first stage and the second stage are separated by the motor.

18. The compressor system according to claim 1, wherein the gas supply port for dynamic pressure and the gas supply port for static pressure are independent of each other.

19. The compressor system according to claim 1, wherein the pads swing within the gas bearing using a pivot on the housing when the bleed gas is caught in the gas bearing.

* * * * *